United States Patent [19]

Dalke et al.

[11] Patent Number: 4,548,783
[45] Date of Patent: Oct. 22, 1985

[54] OUTLET PLUG FOR RECIRCULATION LOOP OF NUCLEAR REACTOR

[75] Inventors: Charles A. Dalke; Bradley G. Stoll, both of San Jose, Calif.

[73] Assignee: General Electric Company, San Jose, Calif.

[21] Appl. No.: 356,903

[22] Filed: Mar. 10, 1982

[51] Int. Cl.[4] .................. G21C 19/04; G21C 19/20
[52] U.S. Cl. ........................ 376/204; 376/260; 376/281
[58] Field of Search ................ 376/203–205, 376/260, 281

[56] References Cited

U.S. PATENT DOCUMENTS

| 4,077,837 | 3/1978 | Schabert et al. | 376/281 |
| 4,393,899 | 7/1983 | Tsuji et al. | 376/260 |
| 4,436,692 | 3/1984 | Stenabaugh | 376/204 |

Primary Examiner—Sal Cangialosi
Attorney, Agent, or Firm—Ivor J. James, Jr.; Samuel E. Turner; Raymond G. Simkins

[57] ABSTRACT

A stopper apparatus for use in blocking the unvalved nozzle of a cooling fluid filled nuclear reactor pressure vessel includes a plug, typically in the shape of a frusto-conical member having inflatable gaskets for sealing against a seat of generally unknown surface characteristics and means for positioning and urging the plug into position to seal the nozzle. The plug is typically positioned by suspension cables whereby the apparatus can be temporarily inserted and removed from the pressure vessel. The urging means is generally a two-way hydraulically driven jack controlled by remotely-actuated hydarulic lines. The apparatus is a tool which permits temporary sealing of a submerged outlet in a reactor vessel to permit maintenance on a fluid recirculation loop.

4 Claims, 3 Drawing Figures

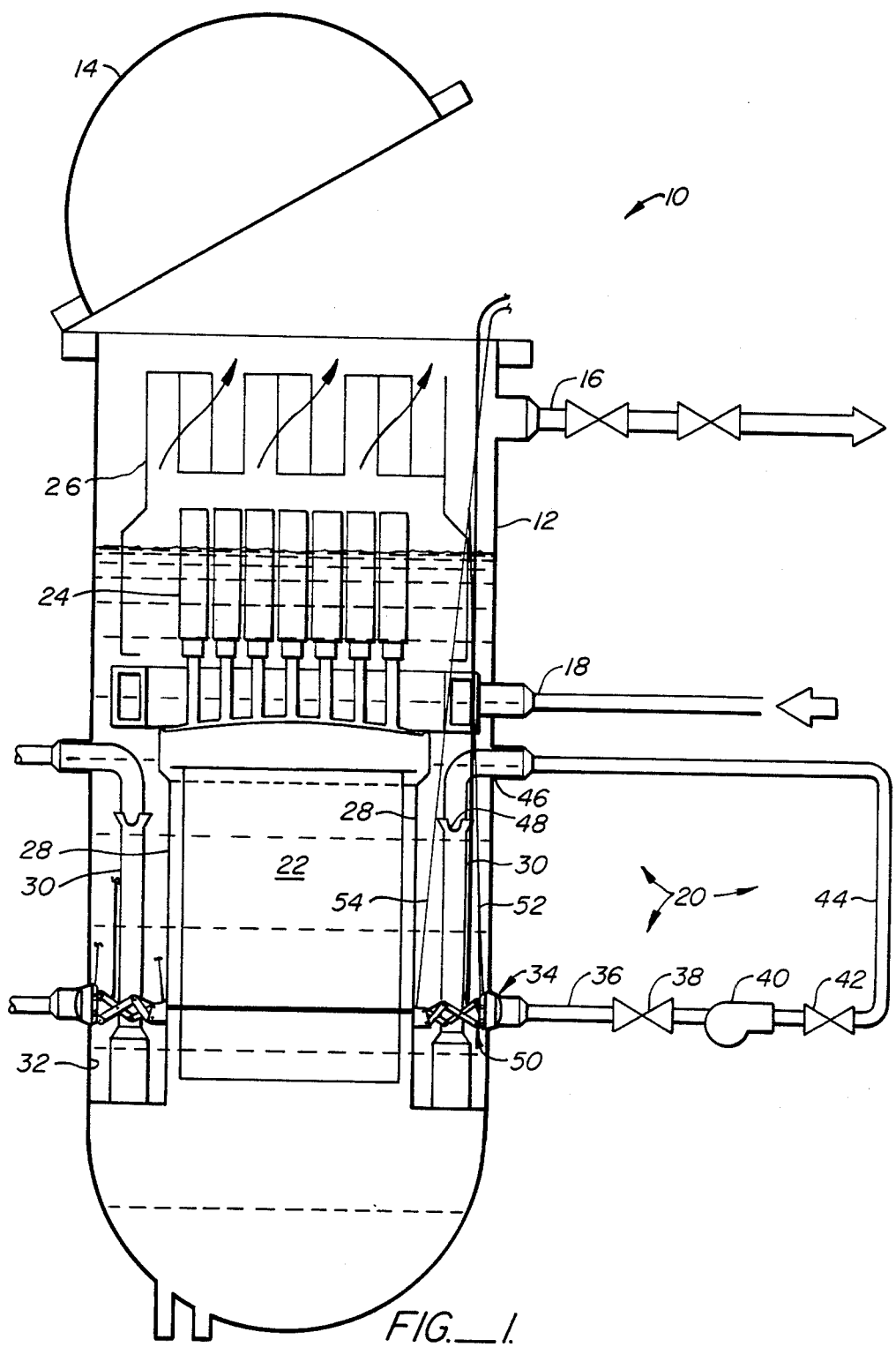
FIG._1.

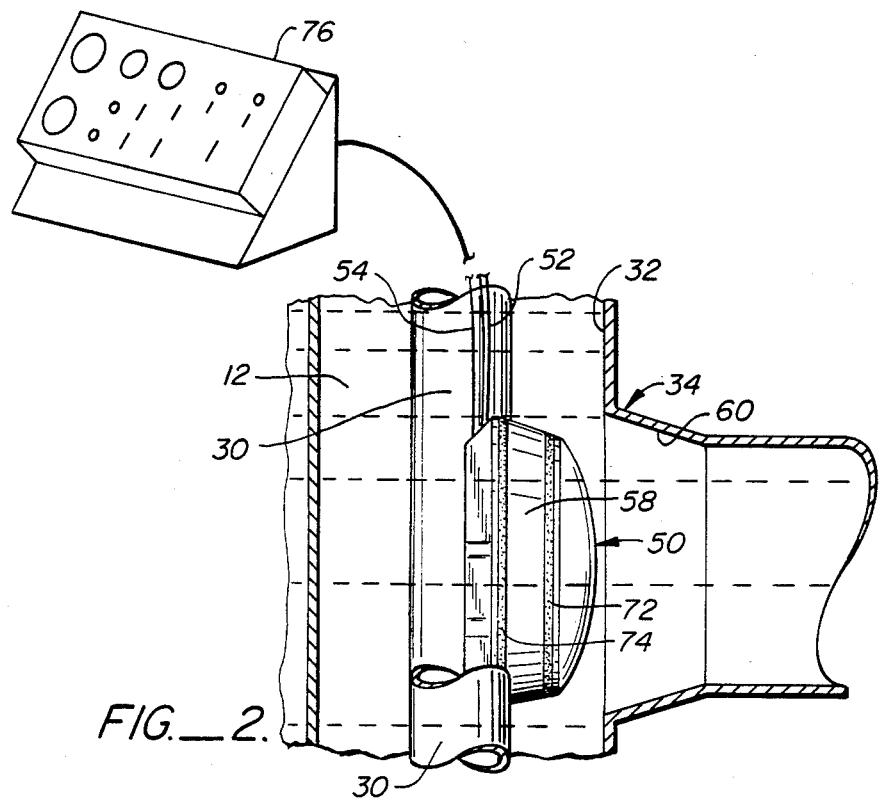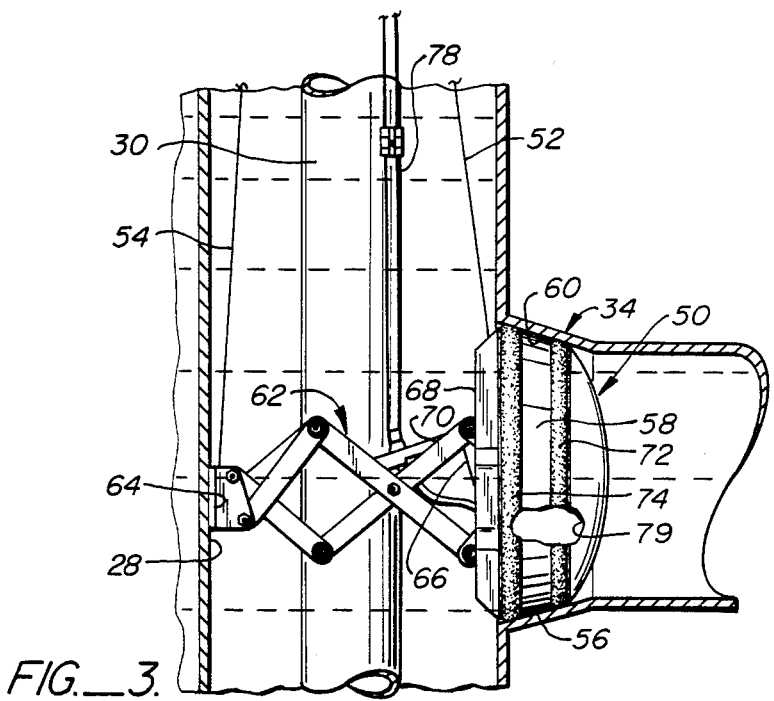

OUTLET PLUG FOR RECIRCULATION LOOP OF NUCLEAR REACTOR

BACKGROUND OF INVENTION

1. Field of Invention

This invention relates to a tool for servicing a nuclear reactor pressure vessel and specifically a tool for permitting closure of a normally submersed fluid outlet in a reactor pressure vessel. During a refueling and maintenance outage of a nuclear boiling water reactor, there is a need to facilitate isolation and drainage of the recirculation suction piping without draining the reactor vessel. In the past, maintenance and repair activity in the recirculation suction piping has required that the reactor vessel be drained to a level below the elevation of the side mounted recirculation outlet nozzle. Because the outlet nozzle is generally located at an elevation below the radioactive core, the entire core must be off loaded before the cooling fluid can be drained. This procedure is undesirable because it is costly, requires handling and storage of radioactive materials and is time consuming.

2. Description of the Prior Art

In the past, valves in the outlet piping have been provided adjacent the outlet nozzle of the recirculation loop. However, such valves are in need of periodic maintenance which cannot be performed when such a valve is in use. Moreover, such valves have also been found to be subject to fluid leakage if not maintained.

Heretofore, it has not been believed practical to provide means for closing off the submersed inlet to the first valve due to the relatively high pressures, close side wall tolerances of a reactor vessel and irregularities in the nozzle throat thought to prevent secure sealing and blockage.

SUMMARY OF THE INVENTION

According to the invention, an apparatus is provided for blocking the outlet nozzle coupled to a cooling fluid recirculation loop in a nuclear reactor pressure vessel for isolating the recirculation loop from the reactor which comprises a frusto-conical plug which mates the generally beveled seat of the outlet nozzle, gasket means mounted to the face portion of the plug which is sufficiently compliant to seal the plug against the possibly irregular seat surface, means for positioning the plug in confronting relation to the nozzle and means for remotely urging the plug into position abutting the nozzle. In specific embodiments, the gasket means is a double O-ring, each of which is remotely inflatable, and the urging means is a hydraulic jack with an end pad for abutting to a structural surface within the reactor pressure vessel which faces the nozzle. The apparatus is collapsible into a compact space which permits it to be lowered into the cooling fluid and deployed in the relatively tightly spaced region adjacent the nozzle. Cables are provided for suspending the apparatus, and fluid filled control lines are coupled to the apparatus for gasket inflation and jack extension functions.

The invention will be better understood by reference to the following detailed description taken in connection with the accompanying drawings.

BRIEF DESCRIPTION OF THE DRAWINGS

FIG. 1 is a side elevation view in cross section of a reactor vessel.

FIG. 2 is a side elevation in partial cross section illustrating the apparatus in a collapsed position.

FIG. 3 is a side elevation in partial cross section showing the apparatus according to the invention in an extended position abutting to a seat of a nozzle.

DESCRIPTION OF SPECIFIC EMBODIMENTS

Referring to FIG. 1, there is shown a typical boiling water reactor 10 in which an apparatus according to this invention may be used. The boiling water reactor 10 comprises a pressure vessel 12 having a vessel head 14 here shown in an open position for maintenance. The vessel 12 has a steam outlet conduit 16, a feed water inlet conduit 18 and a recirculation loop 20. Nuclear fuel resides in a core 22 below steam separators 24 and steam dryers 26 within a shroud 28. Cooling fluid flows in a toroidal pattern about the core shroud impelled by jet pump assemblies 30 ringing the shroud at a radius between the shroud 28 and the vessel wall 32.

The recirculation loop 20 comprises an outlet nozzle 34 coupled to an outlet conduit 36 which in turn is coupled to a first valve 38. The outlet of the first valve 38 is coupled to a recirculating pump 40 which in turn is coupled to a second valve 42 to an inlet conduit 44 which in turn is coupled to an inlet nozzle 46. The inlet nozzle 46 is coupled to a jet pump nozzle assembly 48 forming a portion of the jet pump assembly 30. According to the invention, an apparatus in the form of a plug assembly 50 is provided which can be lowered into the reactor vessel 12 and positioned to seal off the recirculation loop outlet nozzle 34.

Referring now to FIGS. 2 and 3 in connection with FIG. 1, the plug assembly 50 is illustrated in its collapsed position (FIG. 2) and extended position (FIGS. 1 and 3). The plug assembly 50 is suspended by two cables 52, 54 from an elevated location through the open vessel 12. The plug assembly 50 is completely removable from the reactor vessel 12 when not needed.

Turning to FIG. 2, the plug assembly 50 includes a plug member 56 having frusto-conical shape to provide a tapered outer or male face generally conforming with a countersunk or beveled inner seat 60 of the nozzle 34, a jack 62 at one end attached to the plug member 56 and at the other end attached to a jack pad 64, and a hydraulic piston 66 for extending and retracting the jack 62. The hydraulic piston 66 may be a two-way retractable and extendable device normally pivotally mounted at one end in a cavity 68 on the back of the plug member 56 and at the other end pivotally mounted to an arm 70 of a scissor assembly forming the jack 62. The plug assembly 50 may be maneuvered by the two cables 52, 54 into a position facing the nozzle 34 between the outer wall 32 of the pressure vessel 12 and the jet pump assemblies 30. In an extended position, the plug member 56 of the plug assembly 50 abuts to the seat 60 of the nozzle 34 and is held in place by the jack pad 64 pressing against the core shroud 28. Since a scissor type jack has a relatively low retracted length for a given extended length (as compared, for example, to a hydraulic type of jack), the scissor portion of jack 62 easily fits through the narrow space between the jet pump assemblies 30, and the jack pad 64 is sufficiently narrow to also fit through the space between adjacent jet pump assemblies 30.

The seat 60 of the nozzle 34 has a surface whose roughness is generally unknown. It may be irregular due to corrosion, for example. Means must be provided to assure a reliable seal between the seat 60 and the face 58 of the plug member 56. To this end, gasket means comprising first and second O-rings 72, 74 are provided concentrically around the face 58. The O-rings 72, 74 are highly compliant in order to adapt to the abutting surface of the seat 60. Specifically, the O-rings 72, 74 are remotely inflatable. In a collapsed, noninflated condition (FIG. 2) the O-rings 72, 74 are retained in parallel grooves in the face 58 of the plug portion 56. In the inflated condition (FIG. 3), the O-rings 72, 74 expand and seal against the seat 60. Two rings are disposed adjacent the margins of the face 58 to assure that the seal will be adequate in the event of a mismatch in the taper of the face 58 and seat 60 or in the event of irregularities such as a seam or cavity in the seat 60.

The plug assembly 50 is remotely controllable through a hydraulic control panel 76 (FIG. 2) external to the reactor vessel 12. The control panel 76 is coupled to hydraulic lines 78 through which pressure is communicated to inflate and deflate the O-rings 72, 74 and to extend and retract the jack 62.

The plug assembly 50 is preferably buoyant in the cooling fluid, so that it may be more easily handled. To this end, the plug portion 56 may have a hollow chamber 79 to increase displacement of the plug assembly 50 without increasing weight. The chamber 79 may be filled with closed-cell, rigid polyurethane foam arranged in two locations on either side of the cavity 68 into which the jack 62 retracts. The chamber 79 contributes to proper balance of the plug in both the retracted and extended positions, and it minimizes the weight relative to displacement.

In the hydraulic system, the working fluid is preferably demineralized water, although other working fluids may be used. An air-driven hydraulic pump is the power source for the hydraulic system. It may be housed in the control console 76 to which is attached a pneumatic source.

In operation, the plug assembly 50 is lowered into position confronting the nozzle 34, the jack 62 is extended to press the plug portion 56 in facing abutment to the seat 60, and then the O-rings 72, 74 are inflated to seal the seat 60. The recirculation loop 20 can then be drained through an outlet conduit 36 (FIG. 1) connected to the outlet nozzle 34. When the fluid is drained from the recirculation loop, the static pressure of fluid in the reactor vessel 12 helps to hold the plug member 56 in place against the countersunk seat 60 thereby assuring a secure seal. The first valve 38 may then be removed and serviced in the recirculation loop 20 without loss of fluid in the reactor vessel.

The invention has now been explained with reference to the specific embodiments. Other embodiments will be apparent to those of ordinary skill in the art. It is therefore not intended that this invention be limited except as indicated by the appended claims.

We claim:

1. For use in a cooling fluid filled cylindrical nuclear reactor pressure vessel to isolate a cooling fluid recirculation loop, said vessel containing a cylindrical fuel core shroud spaced from the sidewall of said vessel, said vessel having an outlet nozzle in the sidewall of said vessel adjacent said shroud coupled to an outlet conduit of said loop, said nozzle having a beveled seat formed in its inner end, compact collapsible plug apparatus for blocking said nozzle comprising:
    a plug having a tapered face portion generally mating with said beveled seat of said nozzle;
    gasket means mounted to said tapered face portion of said plug for sealing said plug to said beveled seat of said nozzle upon abutment between said face portion and said seat;
    maneuvering means attached to said plug for remotely positioning said plug in confronting relationship with said nozzle, said plug being maneuvered by said maneuvering means downward through the space between said shroud and said sidewall of said vessel to said confronting relationship; and
    jack means attached to said plug, said jack means including an extendable scissor assembly, said scissor assembly being remotely selectively extendable to bear against said shroud for providing a force between said shroud and said plug for urging and maintaining said tapered face portion of said plug in abutment with said beveled seat of said nozzle.

2. The apparatus of claim 10 wherein said plug is frusto-conical in shape and is formed with a hollow cavity, at least a portion of said cavity containing a closed-cell material whereby said plug is buoyant in said cooling fluid.

3. The apparatus of claim 1 including a remotely operable hydraulic actuating piston connected to said scissor assembly for selective extension and retraction thereof.

4. The apparatus of claim 1 wherein said maneuvering means comprises first and second cables, said first and second cables being attached at different locations to said plug for suspending said plug and for aligning said face portion of said plug adjacent said nozzle seat.

* * * * *